United States Patent
Majaniemi

(10) Patent No.: US 10,776,413 B2
(45) Date of Patent: Sep. 15, 2020

(54) METHOD AND SYSTEM FOR DETECTING CONFLICT OF INTEREST

(71) Applicant: Arctic Alliance Europe Oy, Turku (FI)

(72) Inventor: Jari Majaniemi, Turku (FI)

(73) Assignee: Artic Alliance Europe Oy, Turku (FI)

( * ) Notice: Subject to any disclaimer, the term of this patent is extended or adjusted under 35 U.S.C. 154(b) by 329 days.

(21) Appl. No.: 15/794,042

(22) Filed: Oct. 26, 2017

(65) Prior Publication Data

US 2018/0121445 A1  May 3, 2018

(30) Foreign Application Priority Data

Oct. 27, 2016 (FI) .................................... 20165815

(51) Int. Cl.
| | | |
|---|---|---|
| *G06F 16/35* | (2019.01) | |
| *G06Q 10/06* | (2012.01) | |
| *G06F 16/901* | (2019.01) | |
| *G06Q 50/18* | (2012.01) | |

(52) U.S. Cl.
CPC .......... *G06F 16/355* (2019.01); *G06F 16/353* (2019.01); *G06F 16/9027* (2019.01); *G06Q 10/06* (2013.01); *G06Q 50/184* (2013.01); *G06F 2216/11* (2013.01)

(58) Field of Classification Search
CPC .. G06F 2216/11; G06F 16/355; G06F 16/353; G06F 16/9027; G06Q 50/184; G06Q 10/06
See application file for complete search history.

(56) References Cited

U.S. PATENT DOCUMENTS

| | | | | |
|---|---|---|---|---|
| 7,716,226 B2* | 5/2010 | Barney | ............. | G06F 16/24578 |
| | | | | 707/748 |
| 2007/0168345 A1* | 7/2007 | Gibbs | ................. | G06F 16/3344 |
| 2007/0219853 A1* | 9/2007 | Van Luchene | ......... | G06Q 10/00 |
| | | | | 705/310 |

(Continued)

FOREIGN PATENT DOCUMENTS

WO    WO-2011123131 A1 * 10/2011 ............. G06Q 10/06

OTHER PUBLICATIONS

Office Action issued for Finnish Patent Application No. 20165815, dated Nov. 22, 2018, 4 pages (Only English Translation).

*Primary Examiner* — Jesse P Frumkin
(74) *Attorney, Agent, or Firm* — Ziegler IP Law Group, LLC

(57) ABSTRACT

A system for detecting a conflict of interest between entities includes a server and a database. The server defines categories and stores information at the database arrangement. A category to be evaluated is selected for detecting whether or not two given entities have a conflict of interest. A tree structure is created with the category and child and descendent categories of the category. The category and the child and descendent categories are hierarchically arranged as nodes of the tree structure. For the two given entities a conflict potential value is computed for each node of the tree structure. A conflict index value based upon the conflict potential value of that node for each of the two given entities is computed. A conflict of interest between the two given entities is detected if the conflict index value (c) of a node of the tree structure matches at least one predefined criterion.

6 Claims, 4 Drawing Sheets

(56) References Cited

U.S. PATENT DOCUMENTS

| | | | |
|---|---|---|---|
| 2008/0312939 A1* | 12/2008 | Marlett | G06Q 10/00 |
| | | | 705/310 |
| 2011/0093453 A1 | 4/2011 | Frayman et al. | |
| 2011/0208770 A1* | 8/2011 | Snider | G06F 16/9032 |
| | | | 707/769 |
| 2011/0231222 A1 | 9/2011 | Sharma et al. | |
| 2012/0209784 A1* | 8/2012 | Willette | G06Q 30/02 |
| | | | 705/311 |
| 2013/0282599 A1* | 10/2013 | Kang | G06Q 10/10 |
| | | | 705/310 |
| 2015/0051945 A1* | 2/2015 | Lawless | G06Q 10/0635 |
| | | | 705/7.28 |
| 2015/0347489 A1* | 12/2015 | Sherwin | G06Q 50/184 |
| | | | 707/722 |

* cited by examiner

METHOD AND SYSTEM FOR DETECTING CONFLICT OF INTEREST

TECHNICAL FIELD

The present disclosure relates generally to identifying compatibility between entities; and more specifically, to a method and system for detecting a conflict of interest between entities. The entities are, for example, parties, individuals, organizations, companies, but are not limited thereto; alternatively, the entities are real physical processes, operations of machinery, transport systems and similar, wherein conflicts of interest are susceptible to arising between entities involved; by detecting such conflict, resources are susceptible to being deployed more efficiently, resulting in less waste of such resources.

BACKGROUND

Conventionally, an entity (such as a client) seeking a service engages another entity (such as a service provider) having expertise in performing tasks associated with the service; the service, for example, is a combination of intellectual processes and real physical processes, for example involved with the production of a real physical product. For example, an inventor (or client) may engage a patent attorney (or service provider) to secure patent rights for his or her invention. As may be evident, the service provider may be engaged by multiple clients at a same time. Therefore, the service provider may have knowledge of multiple areas of technology. Often, clients prefer to engage service providers with prior knowledge and experience in an area of technology that the client operates in. Therefore, a situation may arise when the service provider with prior experience in an area of technology may be approached for providing services by multiple clients operating in the same area of technology. Additionally, the service provider may be aware of critical confidential information pertaining to such clients. Moreover, such multiple clients may be competitors with conflicting interests.

While providing services to such multiple clients, the service provider may be faced with various problems, described as follows. Firstly, the service provider has a responsibility for providing best possible service to all clients. In such instance, the service provider's awareness of information pertaining to one client may be beneficial for other clients. Therefore, the service provider may be faced with a dilemma between duty of confidentiality towards the clients and responsibility for providing best possible service to the clients. Secondly, the service provider may also be faced with a duty to disclose all matters relevant to proceedings to a court (duty of candour) and duty of confidentiality towards clients. It may be evident that such instances may cause conflicts of interest between the clients and the service providers.

Conventional techniques to identify such possible conflicts of interest include comparing information pertaining to a new client against areas of technology that were previously or are currently being handled by the service provider. However, accuracy (or correctness) of such techniques largely depends on the service provider, and are therefore prone to errors. In an example, the service provider may mistakenly overlook some areas of technology with possible conflict of interest. In another example, the service provider may conceal awareness of possible conflict for professional or personal gain of the service provider. Further, implementation of such conventional techniques may be cumbersome, and may require significant amount of processing.

Therefore, in light of the foregoing discussion, there exists a need to overcome the aforementioned drawbacks associated with conventional techniques for identifying a conflict of interest between entities, such as clients and service providers.

SUMMARY

The present disclosure seeks to provide a method of detecting a conflict of interest between entities. The present disclosure also seeks to provide a system for detecting a conflict of interest between entities. The present disclosure seeks to provide a solution to the existing problems in detecting conflict of interest between entities; such conflict is, for example, a competitive claim for physical resources involved with manufacturing a physical product or data, but not limited thereto. An aim of the present disclosure is to provide a solution that overcomes at least partially the problems encountered in prior art, and provides a simple and reliable solution for detecting conflict of interest between entities.

In one aspect, an embodiment of the present disclosure provides a method of detecting a conflict of interest between entities, characterized in that the method comprises defining a plurality of categories and storing information pertaining to the plurality of categories, wherein the plurality of categories are hierarchical, selecting, from amongst the plurality of categories, at least one category to be evaluated for detecting whether or not two given entities have a conflict of interest, creating a tree structure comprising the at least one category and child and descendent categories of the at least one category, wherein the at least one category and the child and descendent categories of the at least one category, are hierarchically arranged as nodes of the structure, computing, for each of the two given entities, a conflict potential value (p1, p2) for each node of the tree structure, computing, for each node of the tree structure, a conflict index value (c) based upon the conflict potential value (p1, p2) of that node for each of the two given entities, and detecting a conflict of interest between the two given entities if the conflict index value (c) of at least one node of the tree structure matches at least one predefined criterion.

In another aspect, an embodiment of the present disclosure provides a system for detecting a conflict of interest between entities, characterized in that the system comprises
   a server arrangement, and
   a database arrangement coupled in communication with the server arrangement,
wherein the server arrangement is operable to
   define a plurality of categories and store information pertaining to the plurality of categories at the database arrangement, wherein the plurality of categories is hierarchical,
   select, from amongst the plurality of categories, at least one category to be evaluated for detecting whether or not two given entities have a conflict of interest,
   create a tree structure comprising the at least one category and child and descendent categories of the at least one category, wherein the at least one category and the child and descendent categories of the at least one category, are configured to be hierarchically arranged as nodes of the tree structure, compute, for each of the two given entities, a conflict potential value (p1, p2) for each node of the tree structure compute, for each node of the tree structure, a conflict index value (c) based upon the conflict potential value (p1, p2) of that node for each of the two given entities, and detect a conflict of interest between the two given entities if the conflict index value (c) of at least one node of the tree structure matches at least one predefined criterion.

Optionally, the server arrangement is operable to assign, to each node of the tree structure, a weight (w) that corresponds to a measure of relevance of the evaluation of that node in detecting whether or not the two given entities have a conflict of interest.

More optionally, the conflict index value (c) for each node of the tree structure is computed as a function of the conflict potential value (p1, p2) of that node for each of the two given entities and the weight (w) assigned to that node of the tree structure.

Optionally, the server arrangement (108) is operable to collect and store information pertaining to the two given entities; and analyze the information pertaining to the two given entities, wherein the at least one category to be evaluated is selected based upon the analysis of the information pertaining to the two given entities.

Optionally, one of the two given entities comprises a client seeking a service, wherein for the client, a conflict potential value (p1) for a given node of the tree structure is computed based upon a number of patent applications and/or patents that are assigned to the client in a given category associated with the given node of the tree structure.

More optionally, one of the two given entities comprises a service provider who is available for providing a service, wherein for the service provider, a conflict potential value (p2) for a given node of the tree structure is computed based upon a number of work assignments allocated to or completed by the service provider previously that belong to a given category associated with the given node of the tree structure.

Optionally, the server arrangement (108) is operable to re-compute, for each of the two given entities, a new conflict potential value for each node of the tree structure, based upon initial conflict potential values of that node and its neighbouring nodes for that entity.

More optionally, the plurality of categories comprise categories defined by a patent classification system.

Embodiments of the present disclosure substantially eliminate or at least partially address the aforementioned problems in the prior art, and enables reliable detection of conflict of interest between entities.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
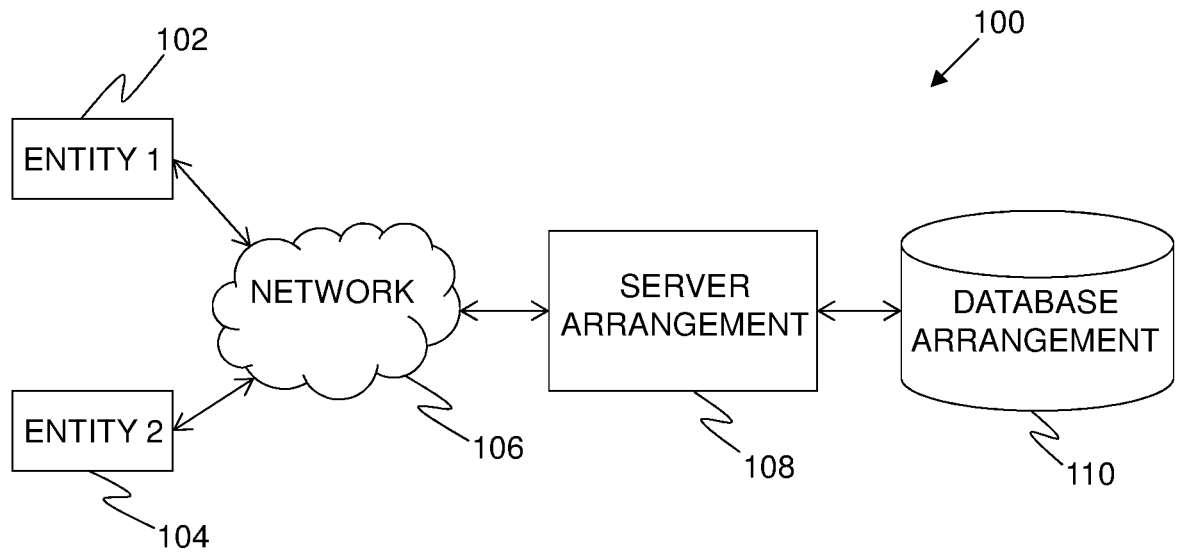
FIG. 1 is a schematic illustration of a system for detecting a conflict of interest between entities, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method of detecting a conflict of interest between entities, characterized in that the method comprises defining a plurality of categories and storing information pertaining to the plurality of categories, wherein the plurality of categories are hierarchical, selecting, from amongst the plurality of categories, at least one category to be evaluated for detecting whether or not two given entities have a conflict of interest, creating a tree structure comprising the at least one category and child and descendent categories of the at least one category, wherein the at least one category and the child and descendent categories of the at least one category, are hierarchically arranged as nodes of the structure, computing, for each of the two given entities, a conflict potential value (p1, p2) for each node of the tree structure, computing, for each node of the tree structure, a conflict index value (c) based upon the conflict potential value (p1, p2) of that node for each of the two given entities, and detecting a conflict of interest between the two given entities if the conflict index value (c) of at least one node of the tree structure matches at least one predefined criterion.

In another aspect, an embodiment of the present disclosure provides a system for detecting a conflict of interest between entities, characterized in that the system comprises a server arrangement, and a database arrangement coupled in communication with the server arrangement, wherein the server arrangement is operable to define a plurality of categories and store information pertaining to the plurality of categories at the database arrangement, wherein the plurality of categories is hierarchical, select, from amongst the plurality of categories, at least one category to be evaluated for detecting whether or not two given entities have a conflict of interest, create a tree structure comprising the at least one category and child and descendent categories of the at least one category, wherein the at least one category and the child and descendent categories of the at least one category, are configured to be hierarchically arranged as nodes of the tree structure, compute, for each of the two given entities, a conflict potential value (p1, p2) for each node of the tree structure, compute, for each node of the tree structure, a conflict index value (c) based upon the conflict potential value (p1, p2) of that node for each of the two given entities, and detect a conflict of interest between the two given entities if the conflict index value (c) of at least one node of the tree structure matches at least one predefined criterion.

The present disclosure provides a method and system for detecting a conflict of interest between entities; such entities are, for example, individuals, organisations, companies, factories, and the conflict of interest, for example, relates to dissemination of knowledge, physical resources, materials, transport but not limited thereto. The method of the present disclosure takes into consideration all relevant areas where a conflict of interest may arise between the entities and enables identification thereof. Moreover, the described method reduces, for example minimises, errors by the service provider in detection of the conflict of interest. Furthermore, in the method and system of the present disclosure, the conflict of interest is detected by comparing the computed values to a predefined criterion. The predefined criterion is customizable, and therefore may be selected to suit requirements of the entities being investigated to provide a more flexible solution than conventional methods. The system of the present disclosure is reliable, easy to implement, and cost effective.

In an embodiment, for example, the term 'entities' used herein relates to individuals and/or organizations associated with a service, such as an entity seeking the service, and an entity available for providing the service. According to an embodiment, a conflict of interest between the entities may relate to situations in which either of the entities are in a position to exploit (or swindle) the other entity for professional or personal benefit. Examples of such entities include, but are not limited to artistes and producers in entertainment industry, clients and lawyers in civil law, and so forth. However, from the foregoing, it will be appreciated that embodiments of the present disclosure are susceptible to being used as control arrangements for control technical facilities that transform input materials into corresponding manufactured products for subsequent transport, distribution and sale.

In an embodiment of the present disclosure, the term 'entities' used herein relates to individuals and/or organizations associated with intellectual property services. Specifically, the entities may relate to two types of participants in the intellectual property services, namely, clients seeking a service and service providers. However, it will be appreciated that such entities, for example, include factories, manufacturing facilities, chemical processing facilities and similar.

In such embodiment, the term 'client' used herein relates to entities such as an individual inventor, a group of inventors or an organization seeking protection of intellectual property rights. It may be evident that the clients (or principals) often engage services of the service providers to secure intellectual property rights at a patent office. For example, such intellectual property rights include patents, trademarks, copyright, and so forth. Moreover, such intellectual property rights include knowhow pertaining to technical manufacture of products, control of technical processes and similar.

Further, in such embodiment, the term 'service provider' used herein relates to an entity having expertise in performing tasks associated with intellectual property services. Examples of service providers include, but are not limited to, law firms, knowledge process outsourcing enterprises, patent attorneys, patent agents, patent searching professionals, and patent drafting professionals.

Therefore, in such embodiment, the conflict of interest between the entities (or the clients and service providers) may relate to service provider malpractice in realm of the intellectual property services. For example, a conflict of interest may arise between a patent attorney engaged to represent a client for securing patent rights, if the patent attorney also agrees to represent a competitor of the client. It may be evident that two entities may be considered for detecting the conflict of interest therebetween. It may also be evident that the system is operable to detect the conflict of interest between a plurality of entities, but at a time, only two entities (i.e. a client and a service provider) may be evaluated for the detection of conflict of interest therebetween. For example, detection of conflict of interest between a client X and multiple service providers A, B, and C may be performed by the system by evaluating information pertaining to client X with respect to each of the service providers A, B, and C, taken one at a time.

The method of detecting the conflict of interest between entities comprises defining a plurality of categories and storing information pertaining to the plurality of categories, wherein the plurality of categories is hierarchical. According to an embodiment, one of two given entities may comprise a client seeking a service, and one of the two given entities may comprise a service provider who is available for providing a service. In an embodiment, the plurality of categories may comprise categories defined by a patent classification system. Examples of patent classification systems include, but are not limited to, International Patent Classification (IPC), United States Patent Classification (USPC), German Patent Classification (DPK), and Cooperative Patent Classification (CPC). For example, the patent classification system may be International Patent Classification (IPC), and the plurality of categories may be Human Necessities, Chemistry, Textiles, Mechanical Engineering, and so forth.

Further, the plurality of categories and information pertaining thereto may be defined and stored at a database arrangement by a server arrangement. Examples of the information pertaining to the plurality of categories may include, but are not limited to, descriptions of scope of the categories, and clustering of sub-categories within the plurality of categories. It may be evident that the information may be indicative of hierarchy within each category, of the plurality of categories.

In an embodiment, the plurality of categories may not be hierarchical. In such instance, information pertaining to the plurality of categories may at least include description of scope of categories.

Further, the method comprises selecting, from amongst the plurality of categories, at least one category to be evaluated for detecting whether or not the two given entities have a conflict of interest. The server arrangement is operable to select the at least one category to be evaluated. Specifically, the at least one category may be selected on the basis of information pertaining to either of the two given entities, instruction(s) from either of the two given entities, instruction(s) from a third party (such as a patent office), and so forth. For example, if a law firm primarily drafts patent applications related to Mechanical Engineering, and a prospective client manufactures steam engines, a category 'F' of the International Patent Classification (IPC) related to 'Mechanical Engineering; Lighting; Heating; Weapons; Blasting' is selected to be evaluated for detecting whether or not the law firm and the prospective client have a conflict of interest.

Thereafter, method comprises creating a tree structure comprising the at least one category and child and descendent categories of the at least one category, wherein the at least one category and the child and descendent categories of the at least one category, are configured to be hierarchically arranged as nodes of the tree structure. The server arrangement is operable to create the tree structure. Specifically, the child and descendent categories of the at least one category constitute the sub categories thereof. More specifically, the child category of the at least one category (or a parent node) may be arranged as a child node extending therefrom, such that height of the child node differs from height of the parent node by 1. Similarly, the descendent categories of the at least one category (or the parent node), may be arranged as descendent nodes extending therefrom, such that height of the descendent nodes differs from height of the parent node by 2 or more.

It may be evident that the hierarchical structure of the plurality of categories may allow a user of the system to select sub-categories (such as the child and descendent categories) of the parent category by selecting only the parent category for evaluation.

Further, the method comprises computing, for each of the two given entities, a conflict potential value (p1, p2) for each node of the tree structure. The server arrangement is operable to compute the conflict potential value. Specifically, the conflict potential value is indicative of possibility of conflict in a given category (represented as a node of the tree structure) for each of the two given entities. It may be evident that the conflict potential value for each of the two given entities may be determined using information pertaining thereto, without dependence on information pertaining to the other given entity. In an example, values of (p1) and (p2) may be positive numbers such as 2, 3, 1.5, 4.2, and so forth. In another example, values of (p1) and (p2) may be negative numbers such as −2, −5, −1.4, −3.7, and so forth.

In an embodiment, for the client, a conflict potential value (p1) for a given node of the tree structure may be computed based upon a number of patent applications and/or patents that are assigned to the client in a given category associated with the given node of the tree structure. For example, for a client ABC, the conflict potential value (p1) for a node of the tree structure is equivalent to number of patent applications assigned to the client ABC in the corresponding category.

According to an embodiment, for the service provider, a conflict potential value (p2) for a given node of the tree structure may be computed based upon a number of work assignments allocated to or completed by the service provider previously that belong to a given category associated with the given node of the tree structure. For example, for a patent attorney, the conflict potential value (p2) for a node of the tree structure is equivalent to number of patent applications drafted by the patent attorney in the corresponding category.

In another embodiment, the conflict potential value (p1, p2) for a given node of the tree structure may be assigned by the user of the system. Specifically, the user may assign the conflict potential values based on at least one of the user's prior experience with any of the two given entities, historical data of the two given entities, and so forth.

According to an embodiment, the method may further comprise re-computing, for each of the two given entities, a new conflict potential value for each node of the tree structure, based upon initial conflict potential values of that node and its neighbouring nodes for that entity. Specifically, the neighbouring nodes of a given node may include nodes connected to the given node via at least one path. A number of paths between the given node and its neighbouring nodes may also be known as distance therebetween. It may be evident that scope of the given node and its neighbouring nodes may be significantly similar and/or interrelated. However, it may also be evident that with increase in distance between the given node and its neighbouring nodes, there may be decrease in amount of similarity and/or interrelation therebetween.

Therefore, in such embodiment, computing the new conflict potential value for the given node may take into account the conflict potential values of its neighbouring nodes and the distance therebetween. For example, given a node Al with two neighbouring nodes Al2 and A13, the new conflict potential value for the node Al may be calculated as a sum of initial conflict potential value of the node Al and average of initial conflict potential values of the nodes Al2 and A13, multiplied by a mathematical function. The mathematical function may be a function of distance of each node Al2 and A13 from the node Al, for example 1/(distance between Al and Al2+distance between Al and A13).

Optionally, for each of the two given entities, the conflict potential value (p1, p2) for each node of the tree structure may be computed as a function of at least one aforementioned criteria.

Thereafter, the method comprises computing, for each node of the tree structure, a conflict index value (c) based upon the conflict potential value (p1, p2) of that node for each of the two given entities. The server arrangement is operable to compute the conflict index value (c) for each node of the tree structure. Specifically, the conflict index value (c) may be indicative of prospect of conflict between the two given entities, while taking information pertaining to both the two given entities into consideration.

In an example, the conflict index value (c) for a node of the tree structure may be computed as a product of conflict potential values p1 and p2 of that node for each of the two given entities.

In another example, the conflict index value (c) for a node of the tree structure may be computed using a mathematical formula, such that the mathematical formula is a function of conflict potential values p1 and p2 of that node for each of the two given entities.

It may be evident that the conflict index values may include positive numbers and/or negative numbers.

Thereafter, the method comprises detecting a conflict of interest between the two given entities if the conflict index value (c) of at least one node of the tree structure matches at least one predefined criterion. The server arrangement is operable to detect the conflict of interest between the two given entities. Specifically, the predefined criterion may include a threshold value, a predefined logical condition, and so forth. In an example, if conflict index value (c) of one node of a tree structure is greater than a threshold value, a category corresponding to that node would be identified as the category of conflict of interest between entities under consideration. In another example, a tree structure may include nodes with negative conflict index values. In such instance, a category corresponding to a node with numerically largest conflict index value would be identified as the category of conflict of interest between entities under consideration.

In an embodiment, the method may further comprise assigning, to each node of the tree structure, a weight (w) that corresponds to a measure of relevance of the evaluation of that node in detecting whether or not the two given entities have a conflict of interest. Optionally, the server arrangement is operable to assign weights to each node of the tree structure. Specifically, the weights assigned to each node of the tree structure may depend on criteria such as, but not limited to, discretion of the user of the system, historical data of either or both of the two given entities, and mathematical functions.

In an embodiment, the weights may be positive numbers such as 2, 5, 3.6, 4.8, and so forth. In another embodiment, the weights may be positive numbers between 0 and 1, such as 0.1, 0.2, 0.3, 0.4, 0.5, 0.6, 0.7, 0.8, 0.9, and so forth.

In an example, the weights assigned to each node of the tree structure may depend on discretion of the user of the system. Specifically, the user of the system may be the client seeking the service, the service provider who is available for providing the service, or a third party individual/enterprise. In an instance, the client seeking the service may assign the weights based on area of interest and/or portfolio of the client. In another instance, the service provider may assign the weights based on prospective areas for business expansion and/or prior work assignments of the service provider. In yet another instance, the third-party, such as a private investigator, may assign the weights based on confidential and/or public information pertaining to the two given entities.

In another example, the weights assigned to each node of the tree structure may depend on historical data of either or both of the two given entities. Specifically, the server arrangement or the user of the system may utilise historical data pertaining to prior conflicts of interest of the two given entities for assigning the weights. In an instance, if historical data of a client indicates presence of a prior conflict of interest of the client in a category CO2 of the International Patent Classification (IPC) related to 'Treatment of water, waste water, sewage, or sludge', the category CO2 may be assigned a higher weight as compared to other nodes in the tree structure.

In yet another example, the weights assigned to each node of the tree structure may depend on mathematical functions. Specifically, the mathematical functions may relate to current state of technology within scope of the categories represented as nodes. For example, if a node P represents 'Augmented Reality Gaming' and a node Q represents 'Computer Gaming', the node Q would be assigned a higher weight as compared to the node P since current state of technology within the category 'Computer Gaming' is more diverse as compared to that within the category 'Augmented Reality Gaming'.

It may be evident that a topmost node of the tree structure corresponding to a defined category of a patent classification system may have a very broad scope. Therefore, weight assigned to the topmost node may be minimal, for example, the weight may be equal to 0. According to an embodiment, the weights of nodes of the tree structure may increase downwards from the topmost node, i.e. child nodes may have higher weights assigned to them as compared to parent nodes thereof. Specifically, child nodes of the topmost node may have higher weights as compared to the topmost node, and descendent nodes may have higher weights as compared to the child nodes.

According to an embodiment, the conflict index value (c) for each node of the tree structure may be computed as a function of the conflict potential value (p1, p2) of that node for each of the two given entities and the weight (w) assigned to that node of the tree structure. Specifically, the conflict index value may take the weight (w) assigned to that node of the tree structure into consideration, since the weight (w) may be indicative of relevance of the evaluation of that node in detecting whether or not the two given entities have a conflict of interest.

In an embodiment of the present disclosure, the method may further comprise collecting and storing information pertaining to the two given entities, and analyzing the information pertaining to the two given entities, wherein the at least one category to be evaluated is selected based upon the analysis of the information pertaining to the two given entities. According to an embodiment, the server arrangement may be operable to collect and store information pertaining to the two given entities at the database arrangement. Specifically, the two given entities may be communicably coupled to the server arrangement via a network, in order for the server arrangement to collect and store confidential and/or public information pertaining to the two given entities. Further, the server arrangement may analyze the information pertaining to the two given entities. Specifically, at least one of comparison, clustering, and authentication of the information pertaining to the two given entities may be performed for analysis thereof. Thereafter, the server arrangement may select the at least one category to be evaluated based upon the analysis of the information pertaining to the two given entities. Specifically, the server arrangement may take into account requirements of the two given entities for selection of the at least one category.

As described above, the system for detecting the conflict of interest between the entities comprises the server arrangement, and the database arrangement coupled in communication with the server arrangement. Specifically, the server arrangement may be operable to detect the conflict of interest by processing information pertaining to the entities.

In an embodiment, the server arrangement may be hardware, software, firmware, or combination of these suitable for detecting the conflict of interest between two given entities. Similarly, in an embodiment, the database arrangement may be hardware, software, firmware, or combination of these suitable for storing a plurality of categories, information pertaining to the plurality of categories, and information pertaining to the two given entities.

DETAILED DESCRIPTION OF THE DRAWINGS

Referring to FIG. 1, illustrated is a schematic illustration of a system 100 for detecting a conflict of interest between entities (such as two given entities 102 and 104), in accordance with an embodiment of the present disclosure. The system 100 comprises a server arrangement 108, and a database arrangement 110 coupled in communication with the server arrangement 108. As shown, the two given entities 102 and 104 are communicably coupled to the server arrangement 108 via a network 106, such as Internet. For example, the two given entities 102 and 104 relate to two types of participants in intellectual property services. In such instance, Entity 1 102 relates to a client (or a principal) that engages services of Entity 2 104, that relates to a service provider, to secure intellectual property rights. The database arrangement 108 is suitable for storing information such as information pertaining to a plurality of categories and the two given entities 102 and 104. Further, the server arrangement 108 is operable to detect the conflict of interest between the two given entities 102 and 104, by processing the information pertaining to the two given entities 102 and 104.

Figure 2:
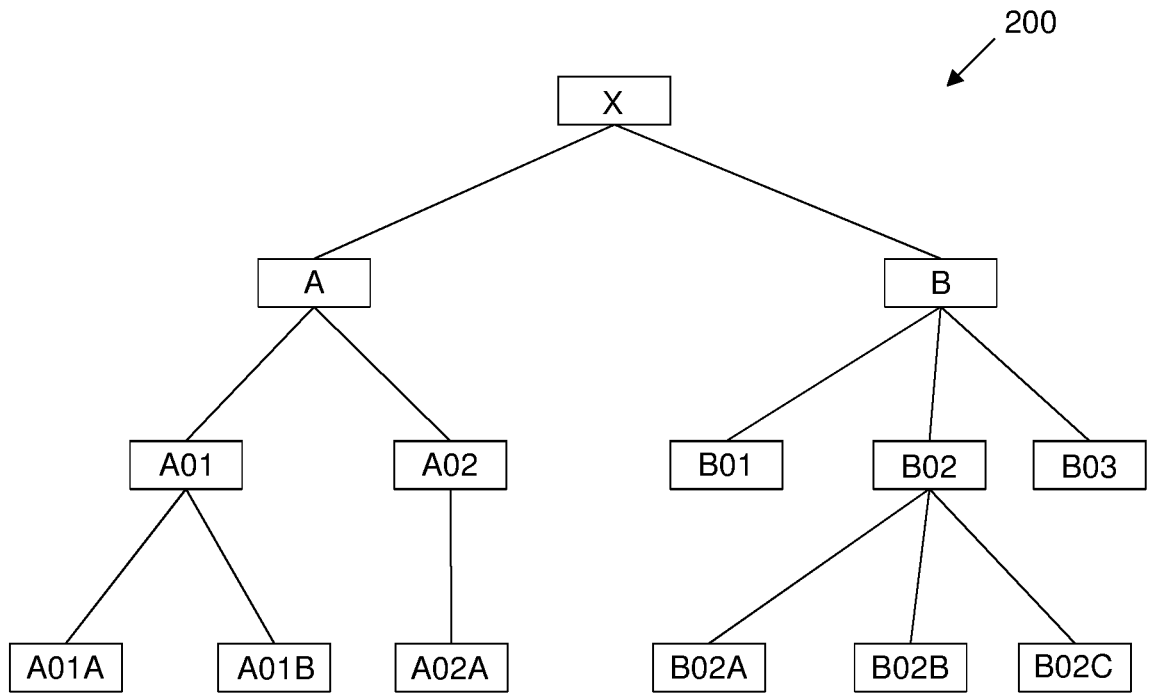
FIG. 2 is a schematic illustration of a tree structure of a category for detecting the conflict of interest between entities, in accordance with an embodiment of the present disclosure.

Referring to FIG. 2, illustrated is a schematic illustration of a tree structure 200 of a category for detecting the conflict of interest between entities, such as the two given entities 102 and 104 of FIG. 1, in accordance with an embodiment of the present disclosure. The tree structure 200 comprises a category depicted by node X and child and descendent categories of the category, hierarchically arranged as nodes of the tree structure 200. In an example, the category depicted by the node X (or parent node) is a category defined by a patent classification system, such as International Patent Classification (IPC). As shown, nodes A and B branching from the parent category are child categories of the node X. Moreover, nodes A01, A02, A01A, A01B and A02A are descendent categories of the node A. Similarly, nodes B01, B02, B03, B02A, B02B and B02C are descendent categories of the node B.

Figure 3:
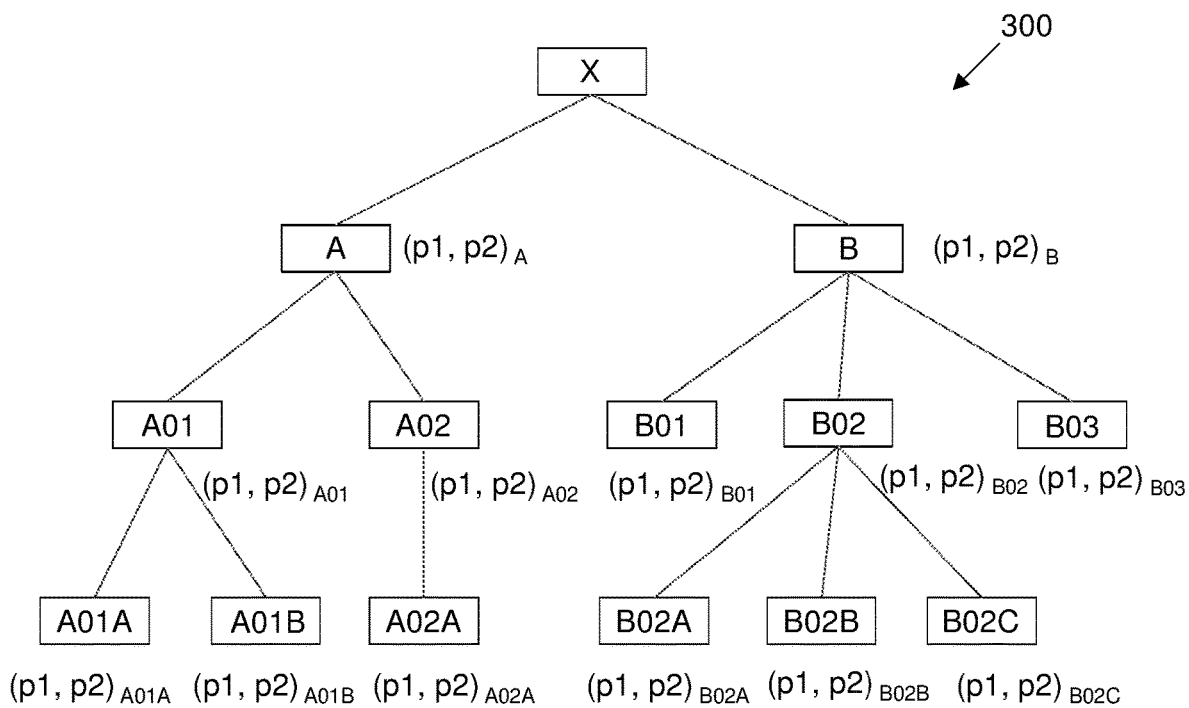
FIG. 3 is a schematic illustration of a tree structure of a category, such as the tree structure of FIG. 2, with computed conflict potential values for each node, in accordance with an embodiment of the present disclosure.

Referring to FIG. 3, illustrated is a schematic illustration of a tree structure 300 of a category, such as the tree structure 200 of FIG. 2, with computed conflict potential values for each node of the tree structure, in accordance with an embodiment of the present disclosure. As shown, for each node of the tree structure, a computed conflict potential value (p1, p2) of that node for each of the two given entities 102 and 104, is displayed alongside that node. Specifically, conflict potential value p1 corresponds to the computed conflict potential value for Entity 1 102 and conflict potential value p2 corresponds to the computed conflict potential value for Entity 2 104. For example, the computed conflict potential value of the node A01 for the two given entities 102 and 104 is $(p1, p2)_{A01}$, equal to $(4,3)_{A01}$.

Figure 4:
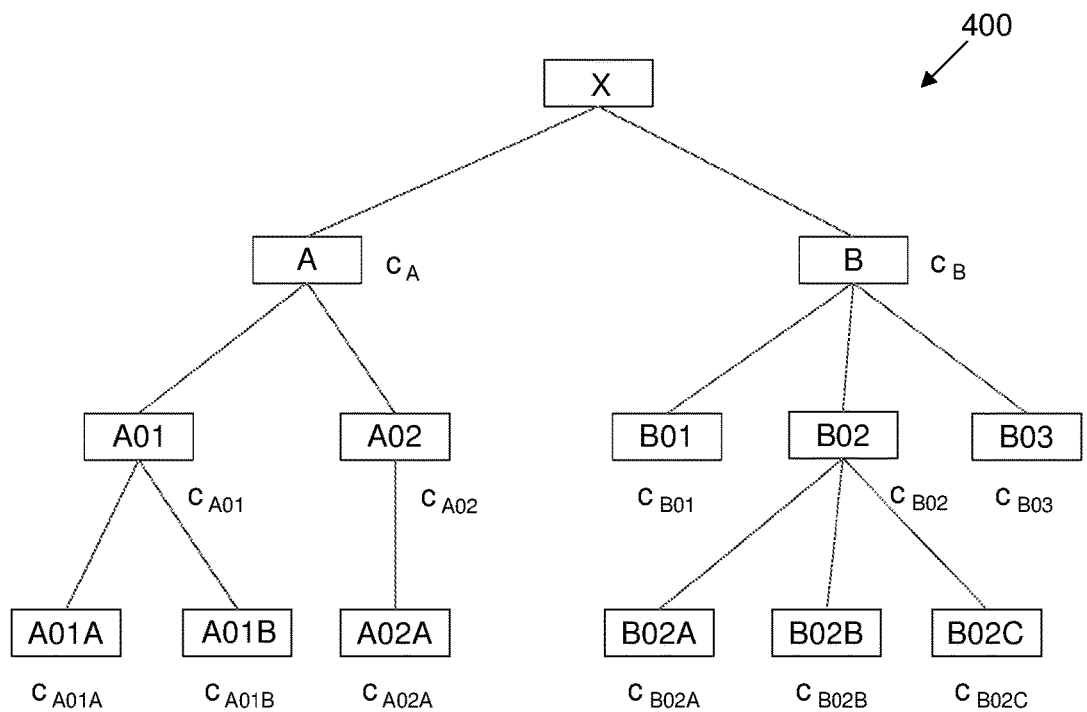
FIG. 4 is a schematic illustration of a tree structure of a category, such as the tree structure of FIG. 2, with computed conflict index values for each node, in accordance with an embodiment of the present disclosure.

Referring to FIG. 4, illustrated is a schematic illustration of a tree structure 400 of a category, such as the tree structure 200 of FIG. 2, with computed conflict index values for each node, in accordance with an embodiment of the present disclosure. The conflict index value (c) for each node of the tree structure 400 is computed based upon the conflict potential value (p1, p2) of that node for each of the two given entities 102 and 104. For example, conflict index value $c_{A01}$ for node A01 is a product of conflict potential values (4, 3) A01, and is equal to 12.

Figure 5:
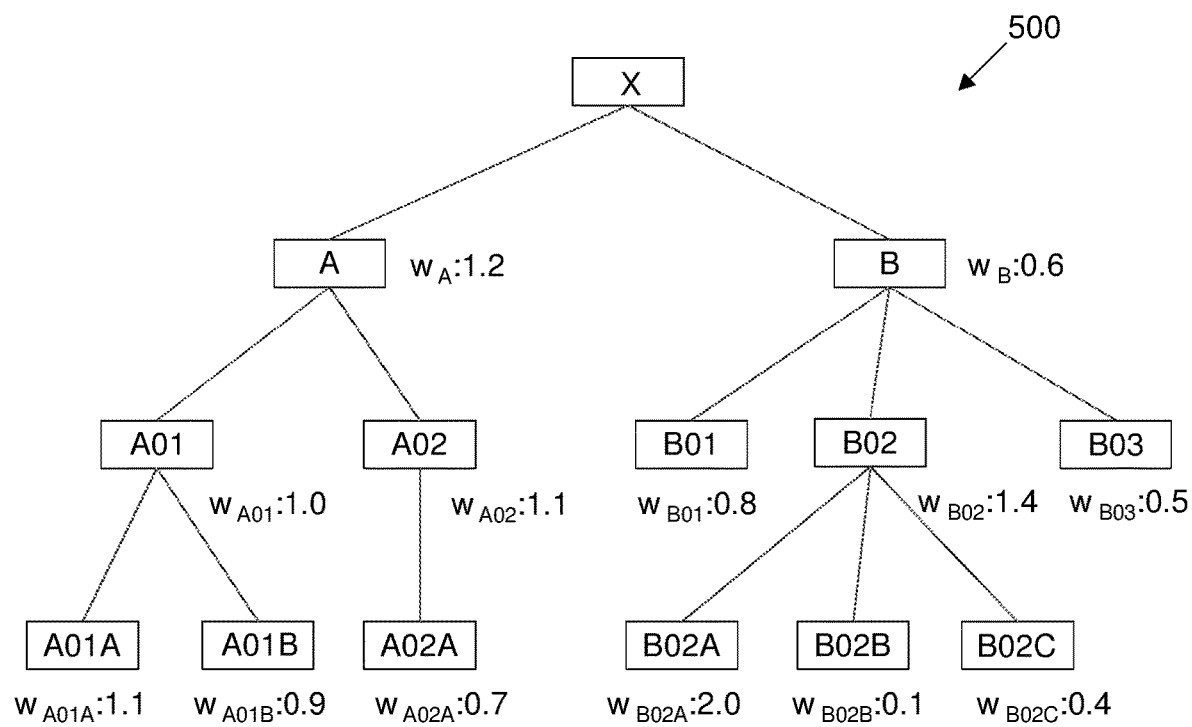
FIG. 5 is a schematic illustration of a tree structure of a category, such as the tree structure of FIG. 2, with weights assigned to each node, in accordance with an embodiment of the present disclosure.

Referring to FIG. 5, illustrated is a schematic illustration of a tree structure 500 of a category, such as the tree structure 200 of FIG. 2, with weights (w) assigned to each node of the tree structure 500, in accordance with an embodiment of the present disclosure. The assigned weights correspond to a measure of relevance of evaluation of that node in detecting whether or not the two given entities 102 and 104 have a conflict of interest. In an example, weight $w_{A01B}$ assigned to node A01B may be 0.9 and weight $w_B$ assigned to node B may be 0.6.

Figure 6:
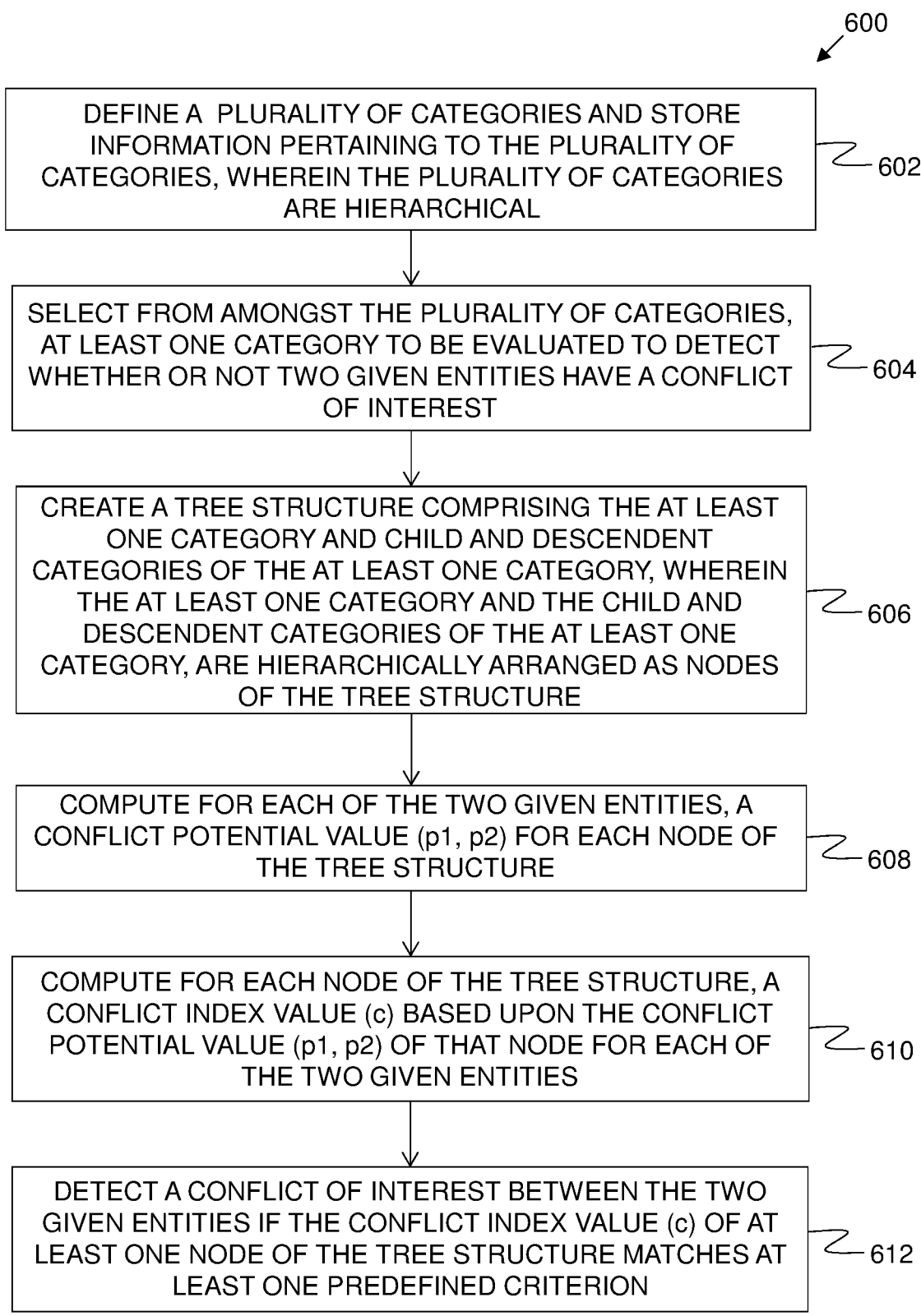
FIG. 6 illustrates steps of a method for detecting a conflict of interest between entities, in accordance with an embodiment of the present disclosure.

Referring to FIG. 6, illustrated are the steps of a method 600 for detecting a conflict of interest between entities, in accordance with an embodiment of the present disclosure. At step 602, a plurality of categories are defined and information pertaining to the plurality of categories is stored, wherein the plurality of categories are hierarchical. At step 604, at least one category is selected from amongst the plurality of categories, to be evaluated for detecting whether or not two given entities have a conflict of interest. At step 606, a tree structure is created, comprising the at least one category and child and descendent categories of the at least one category, wherein the at least one category and the child and descendent categories of the at least one category are hierarchically arranged as nodes of the tree structure. At step 608, a conflict potential value (p1, p2) is computed for each of the two given entities, for each node of the tree structure. At step 610, for each node of the tree structure, a conflict index value (c) is computed, based upon the conflict potential value (p1, p2) of that node, for each of the two given entities. At step 612, a conflict of interest between the two given entities is detected if the conflict index value (c) of at least one node of the tree structure matches at least one predefined criterion.

The steps 602 to 612 are only illustrative and other alternatives can also be provided where one or more steps are added, one or more steps are removed, or one or more steps are provided in a different sequence without departing from the scope of the claims herein. For example, the method 600 may further comprise assigning to each node of the tree structure, a weight (w) that corresponds to a measure of relevance of the evaluation of that node in detecting whether or not the two given entities have a conflict of interest. Optionally, in the method 600, the conflict index value (c) for each node of the tree structure may be computed as a function of the conflict potential value (p1, p2) of that node for each of the two given entities and the weight (w) assigned to that node of the tree structure. In an example, the method 600 may further comprise collecting and storing information pertaining to the two given entities and analyzing the information pertaining to the two given entities, wherein the at least one category to be evaluated is selected based upon the analysis of the information pertaining to the two given entities. In the method 600, one of the two given entities may comprise a client seeking a service, wherein for the client, a conflict potential value (p1) for a given node of the tree structure may be computed based upon a number of patent applications and/or patents that are assigned to the client in a given category associated with the given node of the tree structure. Optionally, in the method 600, one of the two given entities may comprise a service provider who is available for providing a service, wherein for the service provider, a conflict potential value (p2) for a given node of the tree structure may be computed based upon a number of work assignments allocated to or completed by the service provider previously that belong to a given category associated with the given node of the tree structure. In an example, the method 600 may further comprise re-computing a new conflict potential value for each of the two given entities, for each node of the tree structure, based upon initial conflict potential values (p1, p2) of that node and its neighbouring nodes for that entity. Optionally, in the method 600, the plurality of categories may comprise categories defined by a patent classification system.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

Further embodiments related to the system:

A system may be such that the server arrangement is operable to compute the conflict index value (c) for each node of the tree structure as a function of the conflict potential value (p1, p2) of that node for each of the two given entities and the weight (w) assigned to that node of the tree structure.

Additionally the server arrangement may be operable to:

collect and store information pertaining to the two given entities at the database arrangement;

analyze the information pertaining to the two given entities; and select the at least one category to be evaluated based upon the analysis of the information pertaining to the two given entities.

Additionally one of the two given entities may comprise a client seeking a service, wherein the server arrangement is operable to compute, for the client, a conflict potential value (p1) for a given node of the tree structure based upon a number of patent applications and/or patents that are assigned to the client in a given category associated with the given node of the tree structure.

Additionally the system may be such that one of the two given entities comprises a service provider who is available for providing a service, wherein the server arrangement is operable to compute, for the service provider, a conflict potential value (p2) for a given node of the tree structure based upon a number of work assignments allocated to or completed by the service provider previously that belong to a given category associated with the given node of the tree structure.

Additionally the system may be such that the server arrangement is operable to re-compute, for each of the two given entities, a new conflict potential value for each node of the tree structure, based upon initial conflict potential values of that node and its neighbouring nodes for that entity.

Additionally the system may be such that the plurality of categories comprise categories defined by a patent classification system.

By resolving conflicts, embodiments of the present disclosure are susceptible to enabling real physical resources to be employed more efficiently when manufacturing and delivering a real physical product and/or a service. Conservation of resources, and associated efficiency, are generally regarded as being technical effects that are susceptible to attracting patent right protection. From the foregoing, it will be appreciated that embodiments of the present disclosure are susceptible to being used to resolve conflicts of interest in manufacturing industry and therefore must be regarded as being industrially applicable.

I claim:

1. A system for detecting a conflict of interest between entities, wherein the system comprises:
a server arrangement; and
a database arrangement coupled in communication with the server arrangement,
wherein the server arrangement is configured to:
define a plurality of categories and store information pertaining to the plurality of categories at the database arrangement, wherein the plurality of categories is hierarchical;
select, from amongst the plurality of categories, at least one category to be evaluated for detecting whether or not two given entities have a conflict of interest, wherein the two given entities comprise a client seeking a service and a service provider who is available for providing the service;
create a tree structure comprising the at least one category and child and descendent categories of the at least one category, wherein the at least one category and the child and descendent categories of the at least one category, are configured to be hierarchically arranged as nodes of the tree structure;
compute, for each of the two given entities, a conflict potential value for each node of the tree structure, wherein a conflict potential value for a given node of the tree structure is computed for the client based upon a number of patent applications and/or patents that are assigned to the client in a given category associated with the given node of the tree structure, and an average of conflict potential values for the client of nodes neighboring the given node weighted by a distance of the neighboring nodes to the given node; and
wherein a conflict potential value for the given node of the tree structure is computed for the service provider based upon a number of work assignments allocated to or completed by the service provider previously that belong to the given category associated with the given node of the tree structure and an average of conflict potential values for the service provider of nodes neighboring the given node weighted by a distance of the neighboring nodes to the given node;
compute, for each node of the tree structure, a conflict index value based upon the conflict potential value of that node for each of the two given entities; and
detect a conflict of interest between the two given entities if the conflict index value of at least one node of the tree structure matches at least one predefined criterion.

2. The system of claim 1, wherein the server arrangement is operable to assign, to each node of the tree structure, a weight that corresponds to a measure of relevance of the evaluation of that node in detecting whether or not the two given entities have a conflict of interest.

3. The system of claim 2, wherein the conflict index value for each node of the tree structure is computed as a function of the conflict potential value of that node for each of the two given entities and the weight (w) assigned to that node of the tree structure.

4. The system of claim 1, wherein the server arrangement is operable to:

collect and store information pertaining to the two given entities; and analyze the information pertaining to the two given entities, wherein the at least one category to be evaluated is selected based upon the analysis of the information pertaining to the two given entities.

5. The system of claim 1, wherein the plurality of categories comprise categories defined by a patent classification system.

6. A method implemented by a server arrangement coupled to a database arrangement for detecting a conflict of interest between entities, wherein the method comprises:

defining a plurality of categories and storing information pertaining to the plurality of categories, wherein the plurality of categories are hierarchical;

selecting, from amongst the plurality of categories, at least one category to be evaluated for detecting whether or not two given entities have a conflict of interest, wherein the two given entities comprise a client seeking a service and a service provider who is available for providing the service;

creating a tree structure comprising the at least one category and child and descendent categories of the at least one category, wherein the at least one category and the child and descendent categories of the at least one category, are hierarchically arranged as nodes of the structure;

computing, for each of the two given entities, a conflict potential value for each node of the tree structure, wherein a conflict potential value for a given node of the tree structure is computed for the client based upon a number of patent applications and/or patents that are assigned to the client in a given category associated with the given node of the tree structure, and an average of conflict potential values for the client of nodes neighboring the given node weighted by a distance of the neighboring nodes to the given node; and wherein a conflict potential value for the given node of the tree structure is computed for the service provider based upon a number of work assignments allocated to or completed by the service provider previously that belong to the given category associated with the given node of the tree structure and an average of conflict potential values for the service provider of nodes neighboring the given node weighted by a distance of the neighboring nodes to the given node;

computing, for each node of the tree structure, a conflict index value based upon the conflict potential value of that node for each of the two given entities; and detecting a conflict of interest between the two given entities if the conflict index value of at least one node of the tree structure matches at least one predefined criterion.

* * * * *

UNITED STATES PATENT AND TRADEMARK OFFICE
CERTIFICATE OF CORRECTION

Page 1 of 1

PATENT NO. : 10,776,413 B2
APPLICATION NO. : 15/794042
DATED : September 15, 2020
INVENTOR(S) : Jari Majaniemi It is certified that error appears in the above-identified patent and that said Letters Patent is hereby corrected as shown below:

On the Title Page

Item (73):
Change (73) Artic Alliance Europe Oy to (73) Arctic Alliance Europe Oy Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*